United States Patent
Louis et al.

(10) Patent No.: US 6,845,233 B2
(45) Date of Patent: Jan. 18, 2005

(54) RF RECEIVERS WITH REDUCED SPURIOUS RESPONSE FOR MOBILE STATIONS AND METHODS THEREFOR

(75) Inventors: Lazaar J. Louis, Arlington Heights, IL (US); Minh H. Duong, Lake Bluff, IL (US); Charles P. Binzel, Bristol, WI (US)

(73) Assignee: Freescale Semiconductor, Inc., Austin, TX (US)

( * ) Notice: Subject to any disclaimer, the term of this patent is extended or adjusted under 35 U.S.C. 154(b) by 654 days.

(21) Appl. No.: 09/973,596

(22) Filed: Oct. 9, 2001

(65) Prior Publication Data

US 2003/0068995 A1 Apr. 10, 2003

(51) Int. Cl.$^7$ .......................... H04B 1/26; H04B 15/00; H04B 1/06; H04B 7/00; H04B 1/10
(52) U.S. Cl. .................. 455/313; 455/275; 455/295; 455/326
(58) Field of Search ................. 455/130, 226.1, 455/226.2, 226.4, 230, 275, 278.1, 280–283, 284, 293, 295, 296, 313, 326, 330; 327/113, 355

(56) References Cited

U.S. PATENT DOCUMENTS

| | | | |
|---|---|---|---|
| 5,438,692 A | 8/1995 | Mohindra | |
| 5,765,113 A | 6/1998 | Russo et al. | |
| 6,125,272 A | 9/2000 | Bautista et al. | |
| 6,381,265 B1 * | 4/2002 | Hessel et al. | 375/219 |
| 6,389,078 B1 * | 5/2002 | Hessel et al. | 375/259 |

* cited by examiner

*Primary Examiner*—Binh Tieu

(57) ABSTRACT

A mobile wireless communication device (10) having a direct conversion receiver (20) reduces spurious mixer response by predicting blockers on the received RF signal. The chopping frequency of the mixer is changed (305) dynamically in response to the prediction of blockers on the input signal to avoid the mixing the blocker with chopper spurs, thereby improving the response of the receiver. In some embodiments, the mixer is disabled momentarily (402) to verify that poor signal quality results from mixing chopper spurs with blockers. In hopping mode applications, the chopper frequency is changed only on channels having a low confidence factor (512).

23 Claims, 5 Drawing Sheets

RF RECEIVERS WITH REDUCED SPURIOUS RESPONSE FOR MOBILE STATIONS AND METHODS THEREFOR

FIELD OF THE INVENTIONS

The present inventions relate generally to mobile wireless communication devices or stations, and more particularly to radio frequency receivers having improved blocking response for use in mobile wireless communication stations, combinations thereof and methods therefor.

BACKGROUND OF THE INVENTIONS

Direct conversion receivers and very low intermediate frequency (VLIF) receivers having chopping mixers are known generally as disclosed, for example, in U.S. Pat. No. 6,125,272 entitled "Method and Apparatus Providing Improved Intermodulation Distortion Protection", which is assigned commonly with the present application and incorporated herein by reference.

Chopping mixers however are known to cause a spurious frequency response, which may adversely affect receiver performance. The spurious frequency response is produced generally by mixing residual spurs occurring at multiples of the chopping frequency with RF interference. RF interference is otherwise referred to herein as RF blocker signals or merely as blockers.

In some cellular communication applications, for example, GSM, EDGE and DCS band communications, among others, a spurious frequency response may cause exceptions, for example those failing the −43 dBm absolute blocking specification by as much as 25 dB, depending on the choice of the chopper frequency.

The spurious frequency response in direct conversion receivers is especially problematic at higher RF frequencies, for example those typical of DCS band communications, since filtering is not as effective at higher frequencies.

It is also known to reduce the spurious response in mixers by spreading the undesirable signal power spectrum outside the filter bandwidth of the receiver. Khlat, Nadim et al., "Spread Despread Chopping Mixers", 1999.

The various aspects, features and advantages of the present invention will become more fully apparent to those having ordinary skill in the art upon careful consideration of the following Detailed Description of the Invention with the accompanying drawings described below.

DETAILED DESCRIPTION OF THE INVENTIONS

Figure 1:
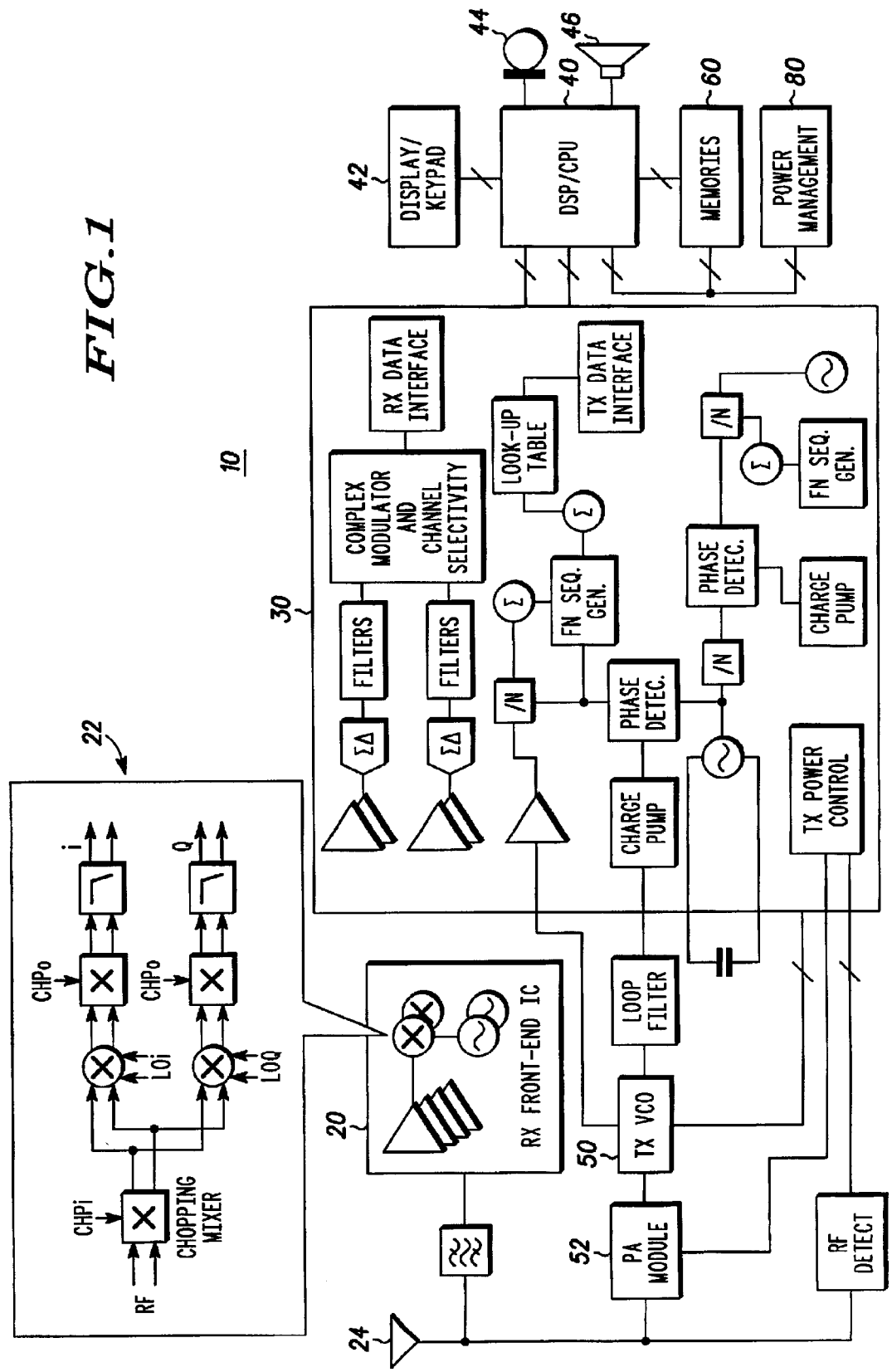
FIG. 1 is a schematic block diagram of a mobile wireless communication device having a direct conversion receiver.

FIG. 1 illustrates an exemplary wireless mobile communication device 10 comprising generally a receiver (Rx) front-end block 20 having an output coupled to a synthesizer and transmitter/receiver (Tx/Rx) back-end block 30 coupled to a digital signal processor/central processing unit (DSP/CPU) 40. The synthesizer and Tx/Rx block 40 is also coupled to a transmitter block 50 having a power amplifier (PA) module 52. The wireless mobile communication device may be, for example, a cellular handset, a wireless enable laptop computer, a one or two-way pager or some other wireless communication device.

The DSP/CPU has memories 60 associated therewith, for example read-only memory (ROM) and read/write memory (RAM). Various input and output devices are coupled to the CPU, including a display and keypad referenced with a common identifier 42, a microphone 44 and speaker 46. The exemplary embodiment also includes a power management module 80.

The receiver front-end block 20 and synthesizer and transmitter/receiver back-end block 30 are preferably integrated circuits (ICs), although other embodiments may be implemented otherwise.

The receiver front-end block 20 includes a chopping mixer, which is enlarged in block 22, with an RF input from an antenna 24. The output I, Q of the chopping mixer is equal to RF(t)*LO(t) when there is no delay between the CHPi(t) and CHPo(t) paths. It is well known that chopper spurs at LO+/−m*CHP adversely affect the receiver when RF blocker signals mix with these spurs.

When the received signal level is −99 dBm and the interference level is −43 dBm, 66 dB rejection is required for a Bit Error Rate (BER) <=2% (C/I>=10 dB), which is necessary to pass the absolute blocking specification (no exceptions allowed). 86 dB rejection is required to pass the −23 dBm blocking specification (limited number of exceptions allowed), and 109 dB rejection is required to pass the 0 dB blocking specification.

In the present inventions, the spurious frequency response of the mixer is reduced in direct conversion RF receivers and very low intermediate frequency receivers by predicting blockers on received RF signals, or channels. The chopping frequency is changed dynamically in response to the predicted existence of blockers on the input signal to avoid mixing the blocker with chopper spurs, thereby improving the response of the receiver. In some embodiments, the chopping mixer is disabled momentarily to verify that poor signal quality results from mixing chopper spurs with blockers. In hopping mode applications, the chopper frequency is changed only on channels having a comparatively low confidence factor (CF) relative to the confidence factor of other channels. The invention is implemented as software.

Figure 2:
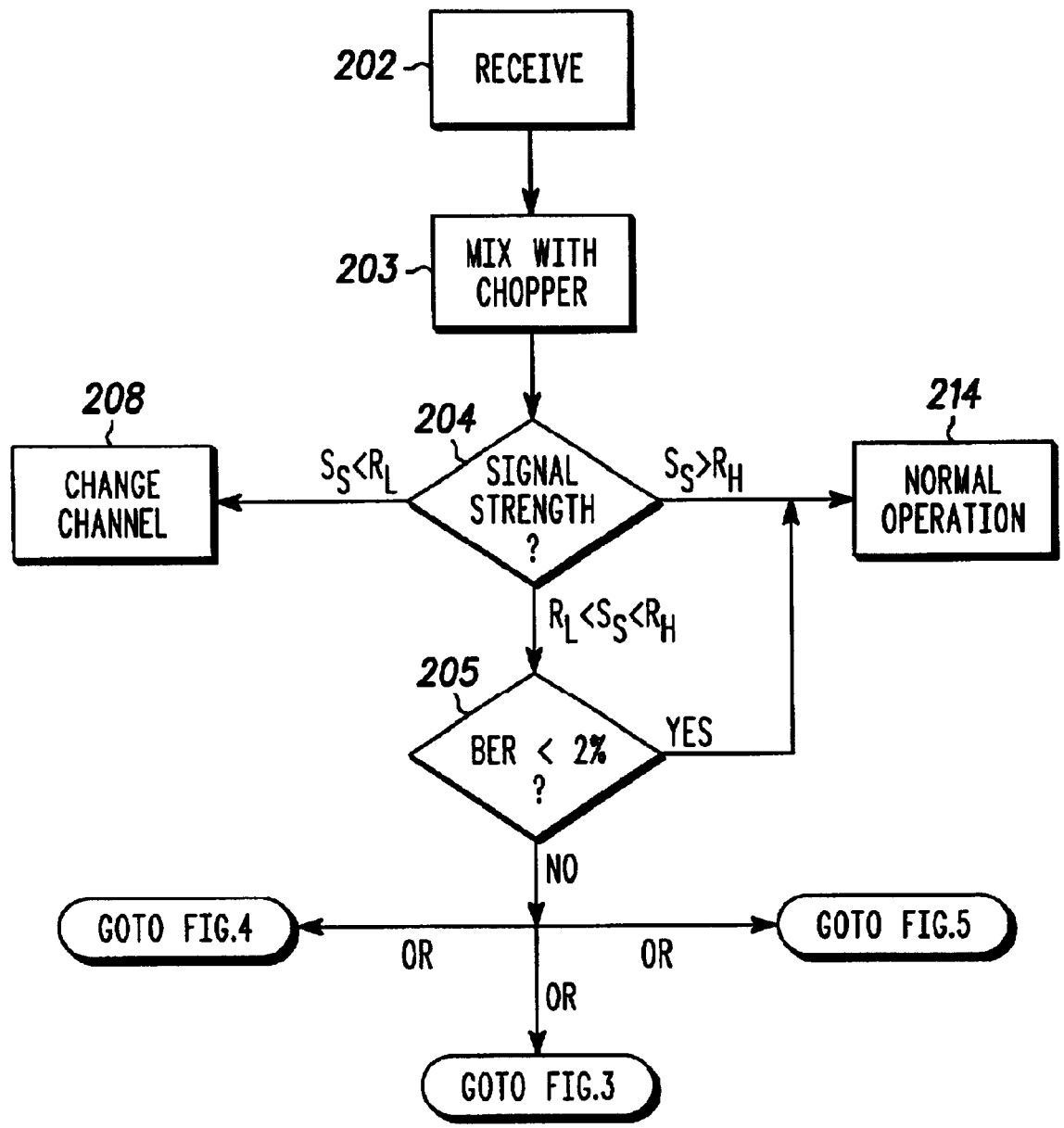
FIG. 2 is an exemplary partial flow diagram of the present invention.

In FIG. 2, an RF signal is received by the receiver at block 202. The received RF signal is mixed at chopping block 203 by mixing the RF signal with a chopping signal at a first chopper frequency in a chopping mixer, for example the chopping mixer 22 in FIG. 1.

In FIG. 2, at block 204 the signal strength of the RF signal is determined by determining whether the RF signal strength $S_S$ is within a specified range. If the RF signal strength $S_S$ is below the specified range, for example $S_S < R_L = -110$ dBm, the RF signal channel is changed at block 208 by receiving the RF signal on a different channel of the receiver. If the signal strength $S_S$ is above a threshold, for example $S_S > R_H = -89$ dBm, then normal mode operation occurs at block 214.

If the shifted RF signal strength $S_S$ is between a specified range, for example $R_H < S_S < R_L$ as determined at block 204, the bit error rate (BER) thereof is checked. At block 205, if the BER of the signal is below some threshold, for example if BER<2%, then normal mode operation is entered at block 214.

In one embodiment, if the BER of the RF signal is not below the threshold, for example if BER>2%, then the chopping mixer frequency is changed as described in FIG. 3.

Figure 3:
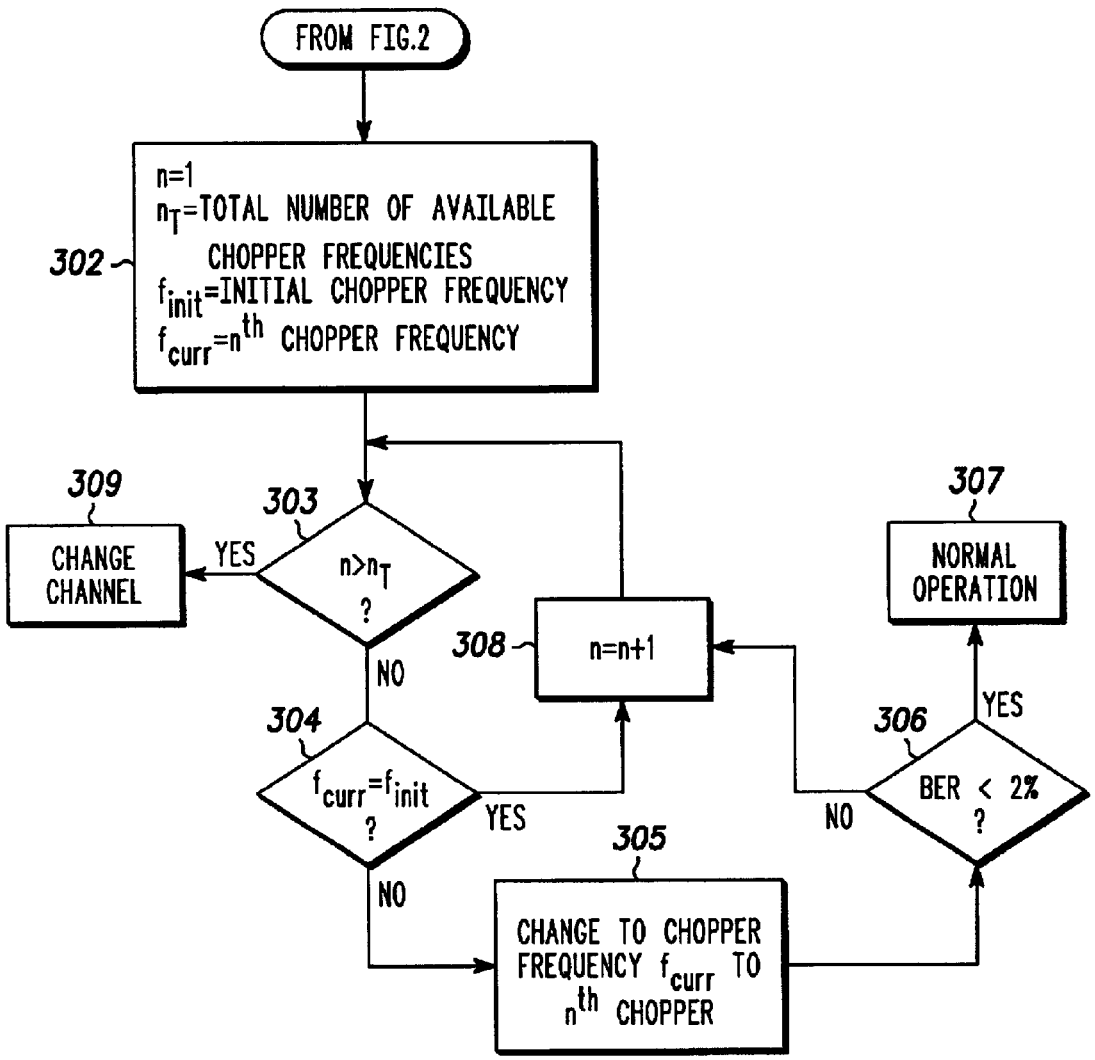
FIG. 3 is a portion of the flow diagram of FIG. 2.

Generally, there are a several possible chopper frequencies, denoted in FIG. 3 as $n_T$, to choose from. In FIG. 3, at block 302, an initial chopper frequency, for example the first chopper frequency, is stored in memory as a variable $f_{init}$. A variable n is also defined to note the current chopper frequency choice. The variable n is initialized (set to 1) at the beginning of the loop in block 302. Another variable $f_{curr}$ is defined as the $n^{th}$ chopper frequency, and this variable holds the current chopper frequency choice during the loop.

At block 303, a determination is made as to whether all chopper frequency choices have been utilized, i.e., whether n is greater $n_T$. If n is less than or equal to $n_T$, then at block 304 it is determined whether $f_{init}$, which corresponds to the first chopper frequency at block 203 in FIG. 2, is same as $f_{curr}$. If True, the counter n is advanced at block 308 and n is checked again at block 303. If $f_{init}$ is different than $f_{curr}$ at block 304, then the chopper frequency is changed to $f_{curr}$ at block 305.

After the chopper frequency is changed at block 305, the BER is checked again at block 306. If the BER of the signal is below the threshold, for example if BER<2%, then normal mode operation is entered at block 307, as in FIG. 2. If the BER of the signal as determined at block 306 is greater than the BER threshold, for example if BER>2%, the current chopper frequency choice is also susceptible to a blocker. Hence the counter, n, is advanced again in block 308, and a new chopper frequency is chosen as discussed above.

At block 303, if all chopper frequency choices have been utilized, for example n is greater than $n_T$, then the channel of the received RF signal is changed at block 309, as in FIG. 2. This suggests that different blockers are present at the same time for all the available chopper frequencies. It is expected however that the chance of this happening is very unlikely, due to the low likelihood that blockers coinciding with all possible chopper frequencies are present at the same time.

Once returned to normal mode operation at block 307, the chopping mixer is operating at a chopper frequency different than the first chopper frequency. At a later time, if a new blocker corrupts the desired signal, the BER of the signal as determined at block 205 in FIG. 2 will be degraded. At block 305 in FIG. 3, the first chopper frequency (n=1), which is the first or default chopper frequency is chosen. Even though there was a blocker that corrupted the signal quality for this choice in the past, it is possible that the blocker will not exist in the future.

Figure 4:
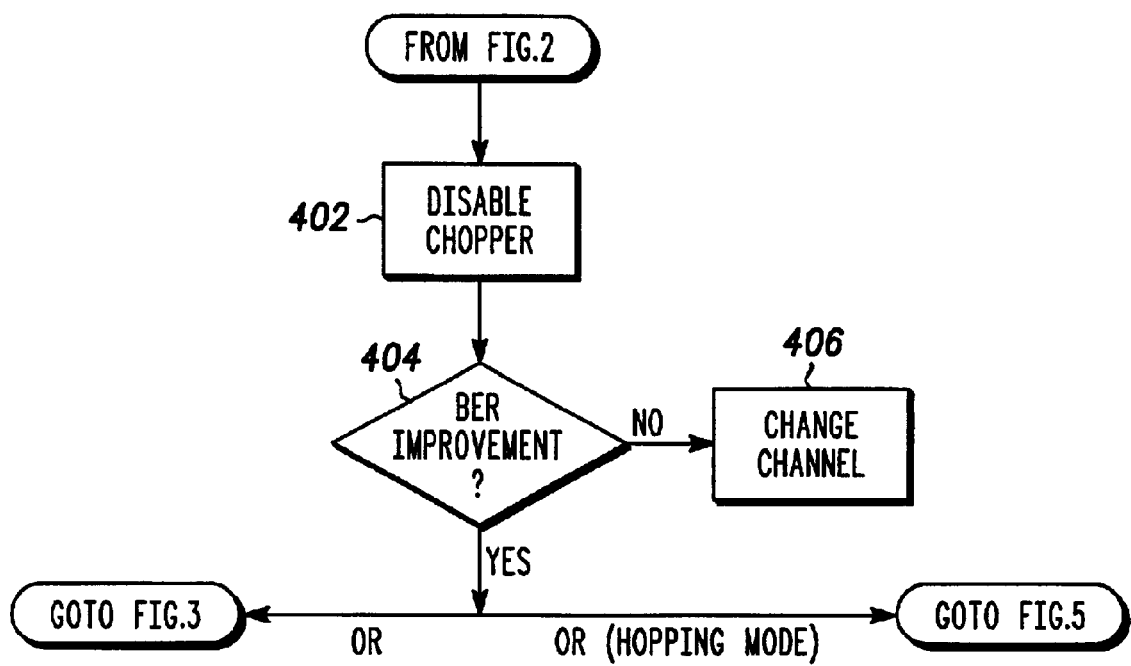
FIG. 4 is an alternative flow diagram branching from FIG. 2.

In an alterative embodiment, if the BER determined at block 205 in FIG. 2 is not below the threshold, BER>2%, instead of changing the chopper frequency at block 305 in FIG. 3, the chopper is disabled at block 402 in FIG. 4. If there is no improvement in the BER after disabling the chopper, as determined at block 404, then the channel of the received RF signal is changed at block 406, as in FIGS. 2 and 3. Rechecking the BER after disabling the chopper will thus indicate whether there is mixing of a blocker and a chopper spur. In FIG. 4, in one embodiment, if at block 404 the BER improves after disabling the chopper frequency, then the chopper frequency is changed at block 305 in FIG. 3 and the algorithm proceeds as discussed above.

In another embodiment, a confidence factor (CF) is assigned to the channel. The confidence factor is an arbitrary factor assigned to the received RF signal upon decoding portions of the signal. The confidence factor may be based on whether any known data on the signal has been corrupted. Lower confidence factors are associated with more data corruption, and a low confidence factor may be indicative of an interference blocker mixing with chopper spurs. The confidence factor may be estimated, for example, by decoding a mid-portion of the received data with a DSP, which communicates the results to the processor. The determination of the confidence factor requires less processing than do BER determinations, and thus in some applications the confidence factor is a useful for identifying, at least preliminarily, blockers mixing with chopper spurs.

In hopping mode applications, it may be difficult to determine which frequency has a blocker since the BER is a combination of several hopping frequency channels. Thus in frequency hopping applications, the confidence factor may be used to identify channels affected by a blocker. In frequency hopping applications, the chopper frequency is changed only on channels having a confidence factor lower than the confidence factor on other hopping channels, thus avoiding the risk of introducing other blockers. A default chopper frequency may be used for the other channels.

In frequency hopping applications, each channel has approximately the same confidence factor, for example 7. In these applications, the chopper frequency is changed only on channels having a confidence factor substantially less than that of the other channels, for example a confidence factor of 5 or less. The confidence factor threshold may be determined relative to the confidence factors of the other channels by a more elaborate statistical analysis or some other approximation, for example by identifying those channels having a confidence factor less than or below a standard deviation of all the channels. In single channel applications, the threshold may be based on empirical data.

Figure 5:
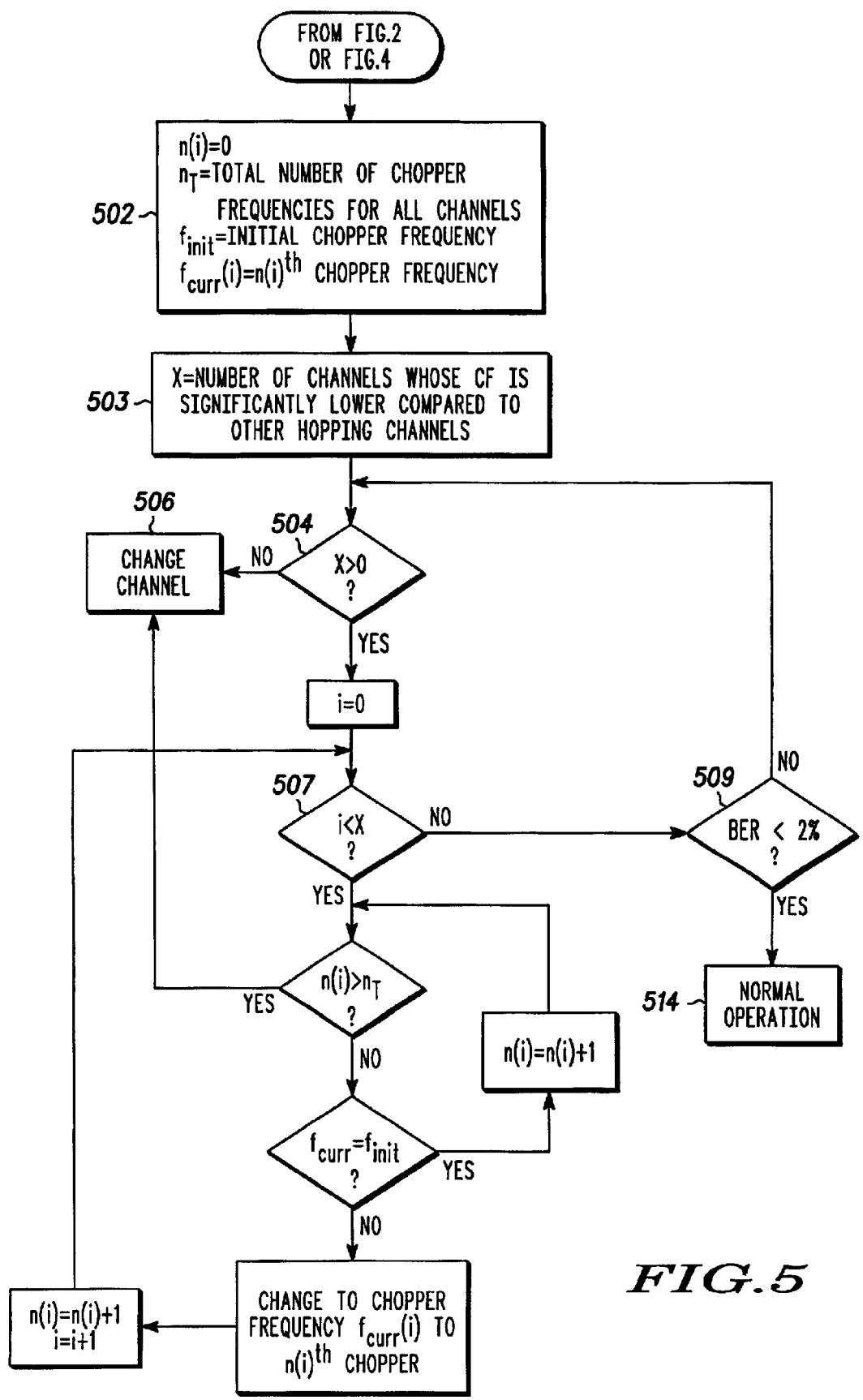
FIG. 5 is another alternative flow diagram branching from FIGS. 2 & 4.

In FIG. 5, at block 502 the same variables as in FIG. 2 are defined as an array whose index is the different hopping channels. It is assumed that all chopping channels having the same total number of options for chopper frequency choice, $n_T$. At block 503, a variable X is defined as the number of channels with a confidence factor (CF) significantly lower in comparison to other hopping channels. A determination is made at block 504 whether the confidence factor is lower for any channel. If X=0, then the channel of the received RF signal is changed at block 506. If the confidence factor is lower for one or more channels, then the chopper frequency is changed only for these channels as described in FIG. 5.

The algorithm used in FIG. 5 is repeated X times for all the affected channels. When the change in chopper frequency for all channels with a low CF is complete as determined at block 507, the BER is again determined at block 509. If the BER is less than the BER threshold, then normal operation is resumed at block 514. If the BER is greater than the BER threshold, for example if BER>2%, then the algorithm described above is repeated to change chopper frequencies for those channels affected.

In FIG. 2, in an alternative embodiment, during frequency hopping applications, if the BER at block 205 is greater than the threshold, BER>2%, then the chopper is disabled for all channels in FIG. 4 and if there is any improvement in the BER, then the algorithm described in FIG. 5 is used to change the chopper frequency for the affected channels.

The present inventions may be used alone or in combination with spreading techniques, for example those disclosed by Khlat, Nadim et al., "Spread Despread Chopping Mixers", 1999 discussed above, to reduce spurious mixer response.

While the present inventions and what is considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A method for reducing a spurious frequency response in direct conversion and very low intermediate frequency receivers, comprising:
   mixing a received RF signal in a chopping mixer operating at a first chopper frequency;
   determining a quality of the mixed RF signal by checking a bit error rate (BER) thereof;
   operating the chopping mixer at a chopper frequency different than the first chopper frequency if the BER of the mixed RF signal exceeds a specified error level.

2. The method of claim 1, determining the quality of the mixed RF signal after changing the chopper frequency, changing the RF signal by receiving a different RF signal on a different channel of the receiver if the BER of the mixed RF signal exceeds the specified error level after changing the chopper frequency.

3. The method of claim 2, operating the receiver in a normal mode if the BER of the mixed RF signal does not exceed the specified error level after changing the chopper frequency.

4. The method of claim 1, determining a strength of the mixed RF signal before determining the quality thereof by determining whether the mixed RF signal strength is within a specified range, determining the quality of the mixed RF signal if the mixed RF signal strength is within the specified range.

5. The method of claim 4, if the mixed RF signal strength is below the specified range, changing the RF signal by receiving the RF signal on a different channel of the receiver.

6. The method of claim 1, changing the RF signal by receiving the RF signal on a different channel of the receiver if the BER of the mixed RF signal exceeds the specified error level after changing the chopper frequency.

7. The method of claim 1, verifying that a BER of the mixed RF signal that exceeds the specified error level is due to a chopper spur mixing with an RF blocker signal by rechecking the BER of the mixed RF signal after disabling the chopping mixer.

8. The method of claim 7, changing the chopper frequency if the BER of the mixed RF signal improves after disabling the chopping mixer.

9. The method of claim 8, re-determining the quality of the mixed RF signal after changing the chopper frequency.

10. The method of claim 9, changing the RF signal by receiving the RF signal on a different channel of the receiver if the BER exceeds the specified error level after changing the chopper frequency.

11. The method of claim 9, operating the receiver in a normal mode if the BER does not exceed the specified error level after changing the chopper frequency.

12. A method in a mobile wireless communication device that receives RF signals on a plurality of channels, comprising:
   mixing RF signals received on the plurality of channels with a chopping mixer operating at a first chopper frequency;
   establishing a confidence factor for each of the channels by checking the corresponding RF signals for corrupted data, the confidence factor bearing a relation to data corrupted;
   changing the chopper frequency to a frequency different than the first chopper frequency only for RF signals received on channels with a confidence factor lower than a confidence factor threshold based on the confidence factors of the other channels.

13. The method of claim 12, determining a quality of the mixed RF signals by checking a bit error rate (BER) thereof, determining whether the confidence factor of the mixed RF signals is lower than the confidence factor threshold if the BER of the mixed RF signals exceeds a specified error level.

14. The method of claim 13, determining a strength of the mixed RF signals before determining the quality thereof, determining the quality of the RF signals if the signal strength it is within a specified range.

15. The method of claim 12, determining a quality of the mixed RF signals after changing the chopper frequency, changing the RF signals by receiving RF signals on different channels of the receiver if the BER of the RF signals exceed a specified error level after changing the chopper frequency.

16. A method for reducing a spurious frequency response in direct conversion and very low intermediate frequency receivers operating in a channel hopping mode, comprising:
   mixing RF signals received on a plurality of channels with a chopping mixer at a first chopper frequency;
   establishing a confidence factor for each of the RF signals by checking the RF signals for corrupted data, the confidence factor bearing a relation to data corrupted;
   changing the chopper frequency of the chopping mixer to a frequency other than the first chopper frequency only for the RF signals having confidence factors lower than the confidence factors of the other RF signals.

17. The method of claim 16, determining a quality of the RF signals by checking a bit error rate (BER) thereof after mixing, determining whether the confidence factor of the RF signals is lower than the confidence factors of the other signals if the BER of the RF signals exceed a specified error level.

18. The method of claim 17, determining a strength of the mixed RF signals before determining the quality thereof, determining the quality of the mixed RF signals if the signal strength thereof it is within a specified range.

19. The method of claim 16, determining a quality of the mixed RF signals after changing the chopper frequency, changing the RF signals by receiving RF signals on different channels of the receiver if the BER of the mixed RF signals exceed the specified error level after changing the chopper frequency.

20. A method for reducing a spurious frequency response in direct conversion and very low intermediate frequency receivers, comprising:
   mixing a received RF signal in a chopping mixer operating at a first chopper frequency;
   establishing a confidence factor for the RF signal received by checking the RF signal for corrupted data, the confidence factor bearing a relation to data corrupted;
   changing the chopper frequency of the chopping mixer to a frequency other than the first chopper frequency only if the confidence factor is lower than a confidence factor threshold.

21. The method of claim 20, determining a quality of the RF signal by checking a bit error rate (BER) thereof after mixing, determining whether the confidence factor of the RF signal is lower than the confidence factor threshold if the BER of the RF signal exceeds a specified error level.

22. The method of claim 21, determining a strength of the mixed RF signal before determining the quality thereof, determining the quality of the mixed RF signal only if the signal strength thereof it is within a specified range.

23. The method of claim 20, determining a confidence factor of the mixed RF signal after changing the chopper frequency, changing the RF signal by receiving RF signal on a different channel of the receiver if the confidence factor is below confidence factor threshold after changing the chopper frequency.

* * * * *